(12) United States Patent
Hashiguchi (10) Patent No.: US 9,759,990 B2
(45) Date of Patent: Sep. 12, 2017

(54) SHOULDER CAMERA ADAPTOR

(71) Applicant: Nihon Video System Co., Ltd., Tsushima-shi, Aichi (JP)

(72) Inventor: Kentaro Hashiguchi, Tsushima (JP)

(73) Assignee: Nihon Video System Co., Ltd., Tsushima-shi (JP)

( * ) Notice: Subject to any disclaimer, the term of this patent is extended or adjusted under 35 U.S.C. 154(b) by 0 days.

(21) Appl. No.: 15/260,025

(22) Filed: Sep. 8, 2016

(65) Prior Publication Data

US 2017/0068148 A1    Mar. 9, 2017

(30) Foreign Application Priority Data

Sep. 9, 2015 (JP) .................. 2015-177975
Mar. 11, 2016 (JP) .................. 2016-048912

(51) Int. Cl.
*G03B 17/56* (2006.01)
*G03B 15/02* (2006.01)
*F16M 13/04* (2006.01)

(52) U.S. Cl.
CPC .......... *G03B 17/561* (2013.01); *F16M 13/04* (2013.01); *G03B 17/563* (2013.01); *G03B 17/566* (2013.01)

(58) Field of Classification Search
None
See application file for complete search history.

(56) References Cited

U.S. PATENT DOCUMENTS

| 5,130,741 A | 7/1992 | Nishigaki et al. |
| 2010/0086295 A1* | 4/2010 | Wood ............... G03B 17/00 396/428 |
| 2014/0300796 A1* | 10/2014 | Sakishita ............ H04N 5/2254 348/341 |

FOREIGN PATENT DOCUMENTS

| JP | H3-35668 A | 2/1991 |
| JP | H 9-285106 A | 10/1997 |
| JP | 2000-293241 | 10/2000 |
| JP | 2001-157441 A | 6/2001 |
| JP | 2007-47464 A | 2/2007 |
| JP | 2010-4507 A | 1/2010 |
| JP | 3162949 U | 9/2010 |
| JP | 2011-107398 A | 6/2011 |

OTHER PUBLICATIONS

Japanese Office Action dated Feb. 9, 2016, in corresponding Application No. JP 2015-177975, filed Sep. 9, 2015, pages.
Japanese Office Action dated Apr. 26, 2016, in corresponding Application No. JP 2016-048908, filed Mar. 11, 2016, 7 pages.
Japanese Office Action dated Apr. 26, 2016, in corresponding Application No. JP 2016-048912, filed Mar. 11, 2016, 3 pages.

* cited by examiner

*Primary Examiner* — Rochelle-Ann J Blackman
(74) *Attorney, Agent, or Firm* — Christensen O'Connor Johnson Kindness PLLC (57) ABSTRACT

A shoulder camera adaptor is provided that inhibits a tripod from falling behind even when a large external battery is mounted to take a video using a tripod. According to the present invention, a shoulder camera adaptor used for application of a handy video camera as a shoulder camera, is provided that includes a base, wherein the base includes a camera holder to hold the handy video camera, and the base is provided with mechanical units to fix the shoulder camera adaptor to a tripod base fixed to a tripod at at least two spots in at least longitudinally different positions in the shoulder camera adaptor.

11 Claims, 8 Drawing Sheets

SHOULDER CAMERA ADAPTOR

TECHNICAL FIELD

The present invention relates to a shoulder camera adaptor used for application of a handy video camera as a shoulder camera.

BACKGROUND ART

For program production by a television station, a television program production company, and the like, large and expensive video cameras called as shoulder cameras are used. Such a camera is capable of, in addition to taking a high quality video, taking a video by being carried on a shoulder and stably taking a video for a long time.

In recent years, small and inexpensive handy video cameras have been markedly improved in performance and they are increasingly capable of taking a video suitable for broadcasting. For cost reduction in program production, there is a demand for use of such a handy video camera for broadcasting.

Such a handy video camera is, however, not designed for use as a shoulder camera, and having to be held by one hand in front of the face for hand held recording, not suitable for taking a video for a long time.

During ENG recording, a cameraman sometimes has to take a video by constantly holding a camera. In such a case, a user has to hold a camera while looking through the viewfinder to capture the recording moment. A shoulder camera adaptor is attached to such a handy video camera and then attached to a tripod for video recording. Taking a video requires operations of zooming, focusing, iris control, and recording. Such an operation is performed by both hands because they are usually free from video recording by carrying a shoulder camera body on a shoulder. In the case of using a handy video camera, however, the left hand holds the body and the right hand performs operations. Even when the body is somewhat lighter, the body is supported only by the left hand, and hand held recording for a long time thus puts a strain on the arm and is very difficult to operate.

To solve such problems, PTL 1 discloses a shoulder camera adaptor to enable use of a handy video camera as a shoulder camera.

CITATION LIST

Patent Literature

PTL 1: JP 2010-4507A

SUMMARY OF THE INVENTION

Technical Problem

The shoulder camera adaptor in PTL 1 includes a mechanical unit (a tripod base attachment and a fixture for a tripod base attachment) to fix a shoulder camera adaptor to a tripod base that is fixed to a tripod. Fixing a shoulder camera adaptor to a tripod base via such a mechanical unit enables video recording using a tripod even when a handy video camera is mounted to a shoulder camera adaptor.

In addition, the shoulder camera adaptor in PTL 1 allows mounting of an external battery, and power supply from such an external battery to the handy video camera enables taking a video for a long time.

In recent years, there has been a demand for video recording even for a longer time, and to meet such a demand, external batteries to be mounted to a shoulder camera adaptor tend to be increased in size. While the present inventor mounted a large external battery to a shoulder camera adaptor for taking a video using a tripod, the tripod happened to be out of balance and fall behind.

The present invention has been made in view of such circumstances and is to provide a shoulder camera adaptor that, even when a large external battery is mounted to take a video using a tripod, inhibits the tripod from falling behind.

Solution to Problem

According to the present invention, a shoulder camera adaptor used for application of a handy video camera as a shoulder camera is provided that includes a base, wherein the base includes a camera holder to hold the handy video camera, and the base is provided with mechanical units to fix the shoulder camera adaptor to a tripod base fixed to a tripod at at least two spots in at least longitudinally different positions in the shoulder camera adaptor.

The present inventor made keen review to solve the problem that a tripod sometimes falls while an external battery is mounted and found that mechanical units to fix the shoulder camera adaptor to a tripod base is provided at at least two spots in at least longitudinally different positions in the base of the shoulder camera adaptor, thereby enabling appropriate selection of the mechanical unit to fix the shoulder camera adaptor to the tripod base in accordance with the presence of an external battery mounted to the shoulder camera adaptor and the weight of the mounted external battery. The tripod is thus inhibited from being out of balance to fall while the shoulder camera adaptor is fixed to the tripod.

Various embodiments of the present invention are listed below as examples. The embodiments below may be combined with each other.

Preferably, the mechanical units include first and second mechanical units, and the second mechanical unit is provided in longitudinally and transversely different positions, from the first mechanical unit, in the shoulder camera adaptor.

Preferably, the base includes first and second bases, the second base is provided in longitudinally and transversely different positions, from the first base, in the shoulder camera adaptor, and the second base is provided with the camera holder.

Preferably, the mechanical units include first and second mechanical units, and the first mechanical unit is provided in the first base and the second mechanical unit is provided in the second base.

Preferably, a rear wall rising from the base is provided near a rear end of the base, and the rear wall is provided with a battery attachment to allow attachment of an external battery.

Preferably, the shoulder camera further includes a handle disposed above the handy video camera, wherein the handle is provided with a video light terminal to supply power to a video light mounted to the handle.

Preferably, the shoulder camera adaptor further includes a power output unit to be controlled in accordance with a power supply on and off signal from a cameraman of the handy video camera.

Preferably, the shoulder camera adaptor further includes a power supply circuit to supply external power supplied from an external battery to the handy video camera, wherein the power supply circuit is configured to supply, when a voltage of the external power exceeds a predetermined value, power at a constant voltage to the handy video camera and lower, when the voltage of the external power falls below the predetermined value, a voltage of the power supplied to the handy video camera following lowering of the voltage of the external power.

Preferably, the shoulder camera adaptor further includes an operation unit to control output of a control signal to the handy video camera.

Preferably, the shoulder camera adaptor further includes a handle disposed above the handy video camera, wherein the operation unit is provided in the handle.

Preferably, the operation unit is provided at a front end of the base.

Preferably, the operation unit is configured to control output of at least one of a zoom remote signal, an iris signal, and a REC on and off signal.

According to another aspect of the present invention, a power supply circuit to supply external power supplied from an external battery to an external device is provided, wherein the power supply circuit is configured to supply, when a voltage of the external power exceeds a predetermined value, power at a constant voltage to the external device and lower, when the voltage of the external power falls below the predetermined value, a voltage of the power to be supplied to the external device following lowering of the voltage of the external power.

According to such a configuration, when the voltage of the external power falls below the predetermined value, the voltage of the power to be supplied to an external device is configured to be lowered following the lowering of the voltage of the external power. When the remaining external battery power is running low and the voltage of the external power falls below the predetermined value, the voltage of the power supplied to the external device is thus lowered. A warning that the remaining external battery power is running low is allowed to be generated in the external device. This enables replace of the external battery with appropriate timing to prevent sudden termination of power supply to the external device.

According to another aspect of the present invention, a shoulder camera adaptor used for application of a handy video camera as a shoulder camera is provided that includes a base, wherein the base includes a camera holder to hold the handy video camera, the base is provided with a mechanical unit to fix the shoulder camera adaptor to a tripod base fixed to a tripod, and the shoulder camera adaptor includes at least one of configurations below:

(1) the shoulder camera adaptor is provided, wherein the base is provided with a shoulder mount to be placed on a shoulder of a cameraman using the shoulder camera adaptor, and the mechanical unit is provided across the shoulder mount;

(2) the shoulder camera adaptor includes a handle disposed above the handy video camera, wherein the handle is provided with a video light terminal to supply power to a video light mounted to the handle;

(3) the shoulder camera adaptor includes a power supply circuit to supply external power supplied from an external battery to the handy video camera, wherein the power supply circuit is configured to supply, when a voltage of the external power exceeds a predetermined value, power at a constant voltage to the handy video camera and lower, when the voltage of the external power falls below the predetermined value, a voltage of the power supplied to the handy video camera following lowering of the voltage of the external power; and (4) the shoulder camera adaptor includes an operation unit to control output of a control signal to the handy video camera and a handle disposed above the handy video camera, wherein the operation unit is provided in the handle.

DESCRIPTION OF EMBODIMENTS

Embodiments of the present invention are described with reference to the drawings. Various characteristics in the embodiments described below may be combined with each other. Each characteristic is independently inventive.

As illustrated in FIGS. 1 to 8, a shoulder camera adaptor 10 in an embodiment of the present invention is used for application of a handy video camera 1 as a shoulder camera. The shoulder camera adaptor 10 includes a base 5. The base 5 is provided with a first base 3 and a second base 4.

Figure 8:
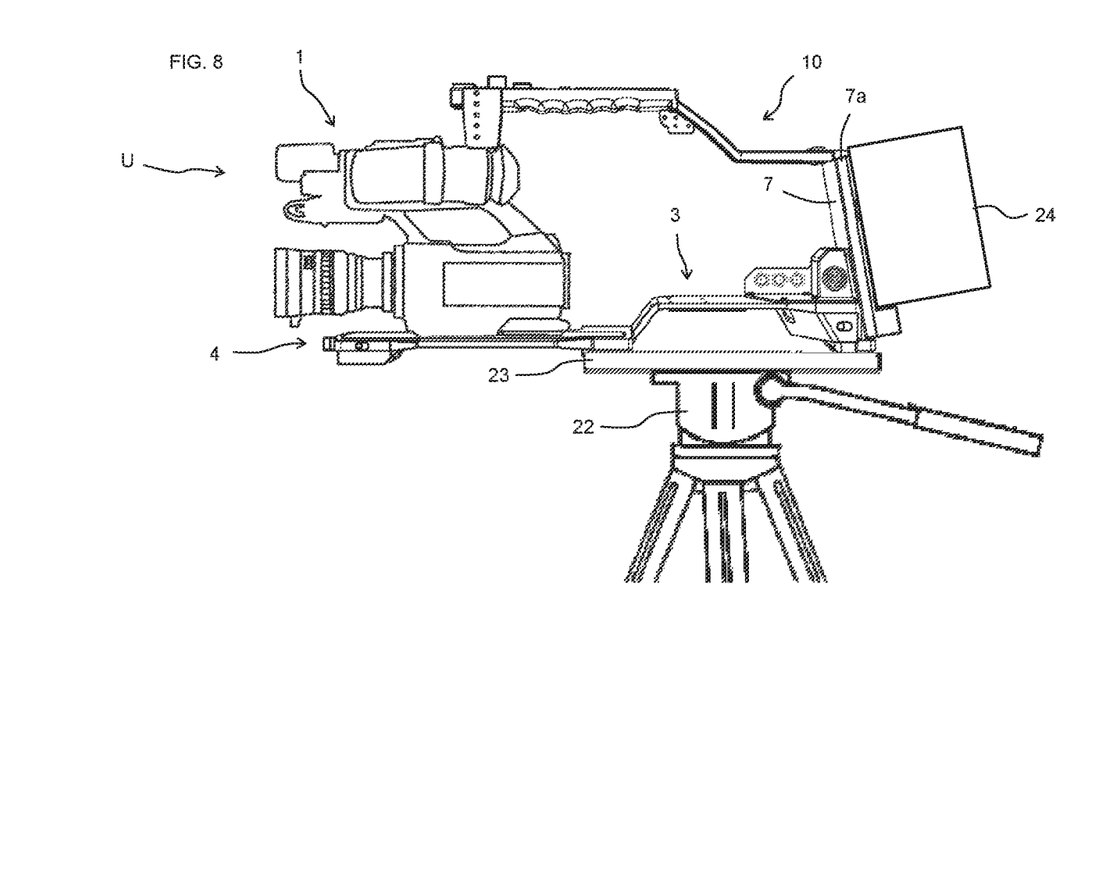
FIG. 8 is a right side view illustrating a state of fixing the shoulder camera adaptor 10 to the tripod base 23 using a mechanical unit of a first base 3.

The first base 3 is provided on the rear end side of the base 5, and the first base 3 is provided with a tripod base attachment 3a and a fixture 3b for the tripod base attachment. As illustrated in FIG. 8, the attachment 3a and the fixture 3b function as a first mechanical unit to fix the shoulder camera adaptor 10 to a tripod base 23, fixed to a tripod 22. The tripod base 23 is a component fixed to a tripod to enable attachment and detachment of a video camera to the tripod by a single operation. For example, VCT-14 and VCT-U14 manufactured by Sony Corp., VST-14 manufactured by Nippon Video System Co., ltd., and the like are commercially available. Between the attachment 3a and the fixture 3b, a shoulder mount 3c to be placed on a shoulder of a cameraman is provided. The cameraman is allowed to use a handy video camera as a shoulder camera by placing the shoulder mount 3c on the shoulder. The shoulder mount 3c may be provided with a cushion as appropriate.

Figure 1:
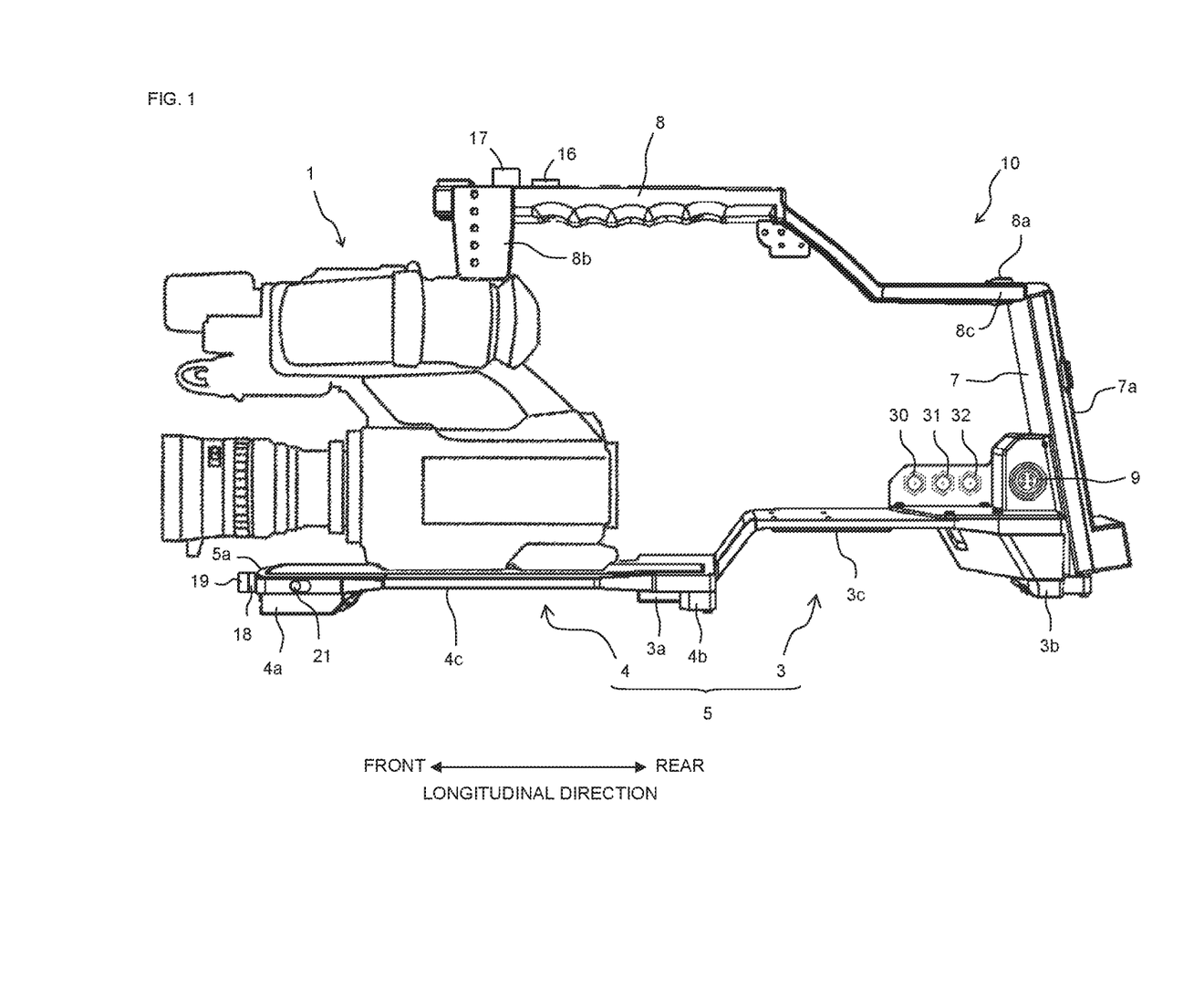
FIG. 1 is a right side view illustrating a state of mounting a handy video camera 1 to a shoulder camera adaptor 10.
Figure 2:
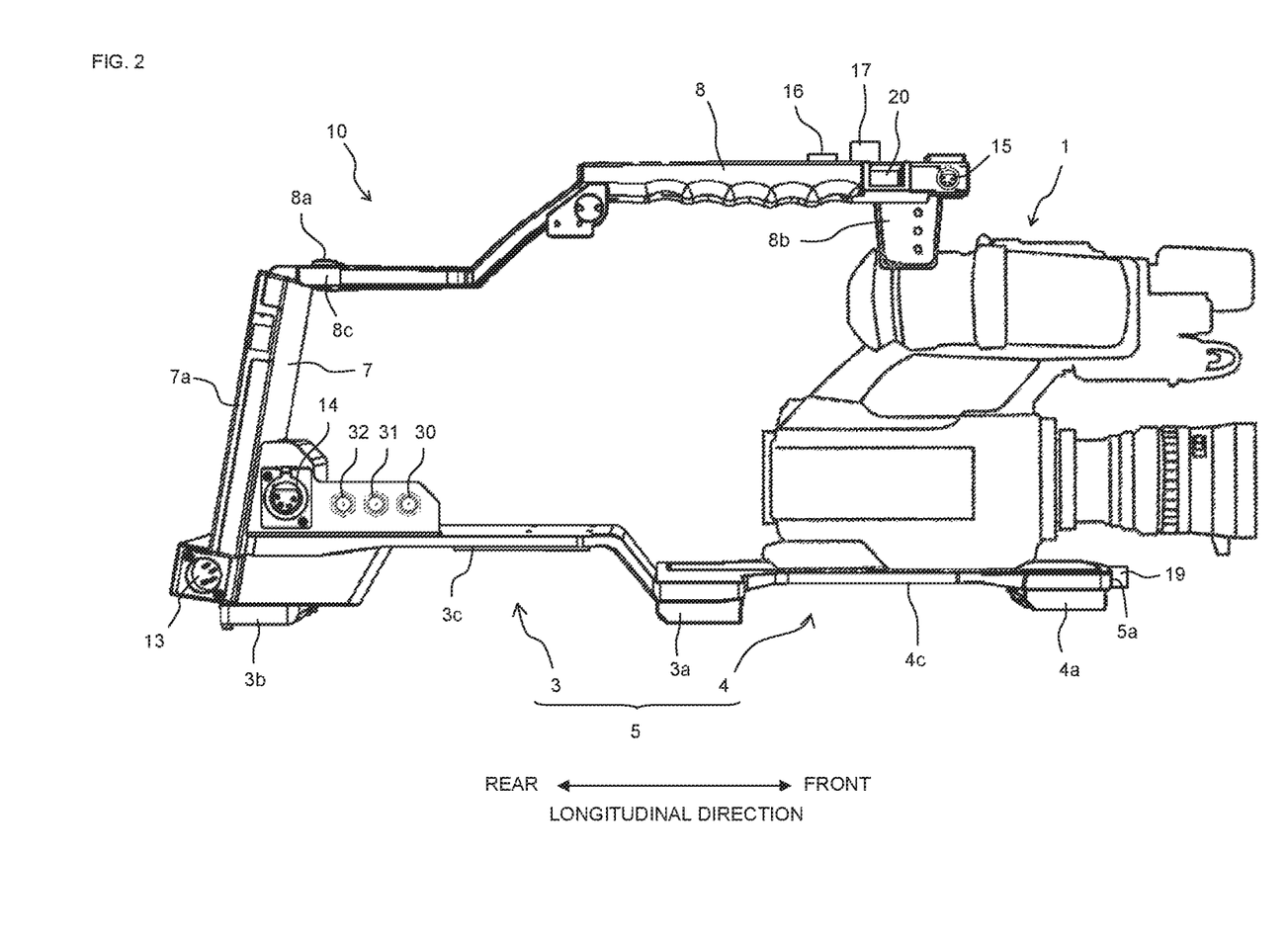
FIG. 2 is a left side view of FIG. 1.
Figure 3:
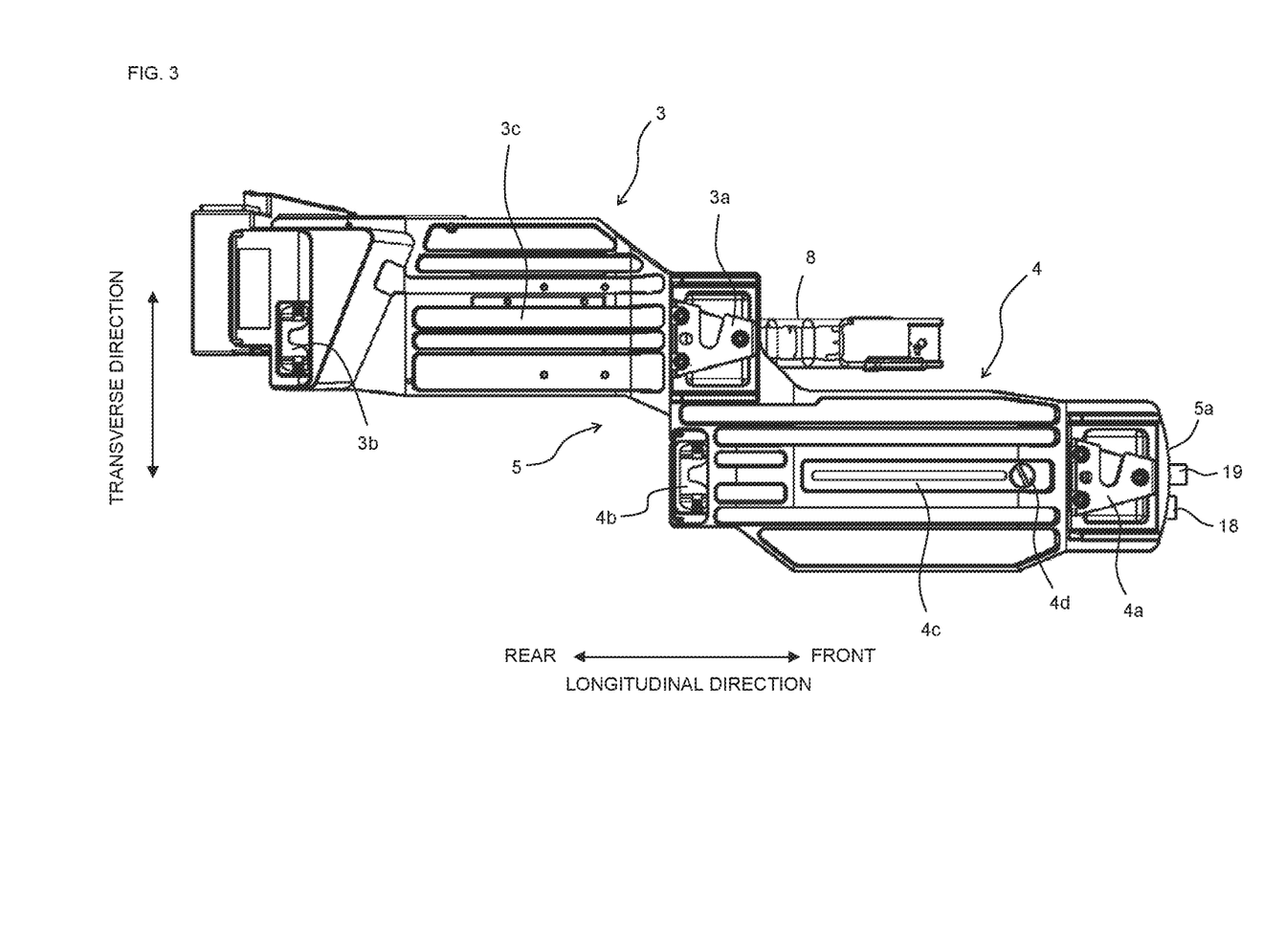
FIG. 3 is a bottom view of the shoulder camera adaptor 10.
Figure 4:
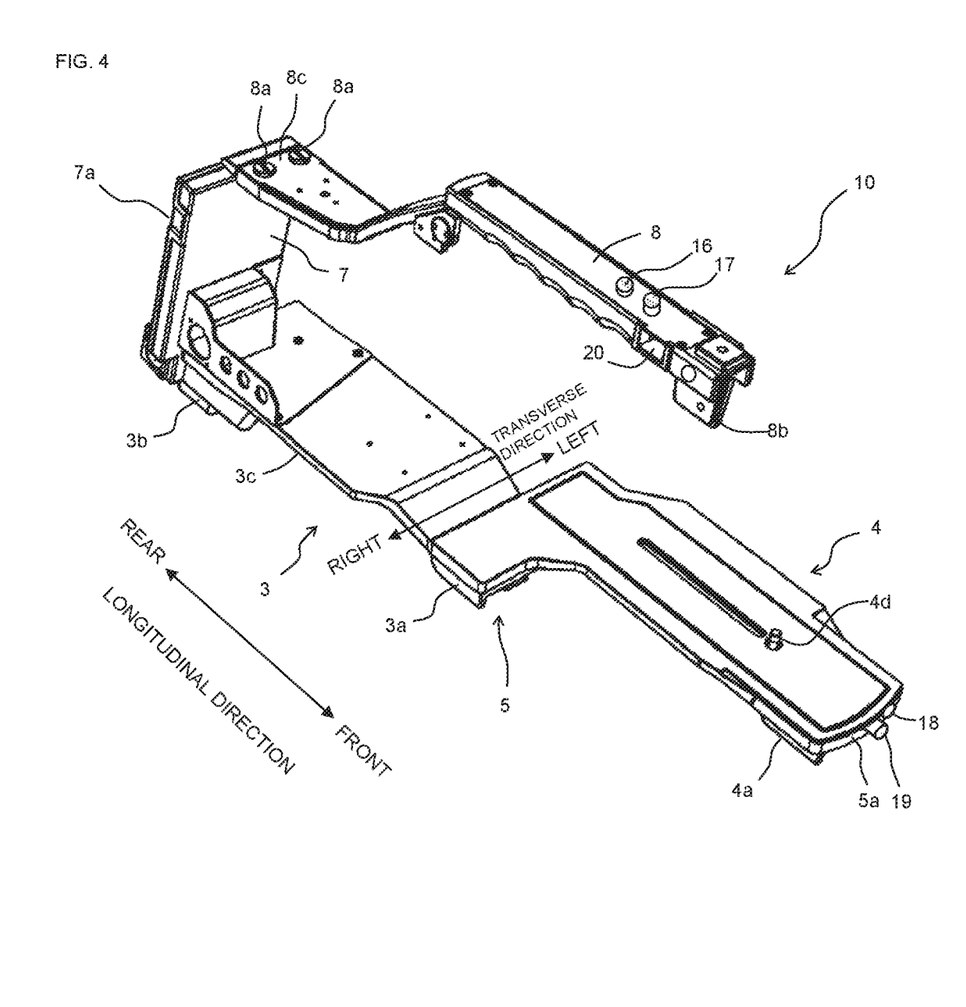
FIG. 4 is a perspective view of the shoulder camera adaptor 10.
Figure 5:
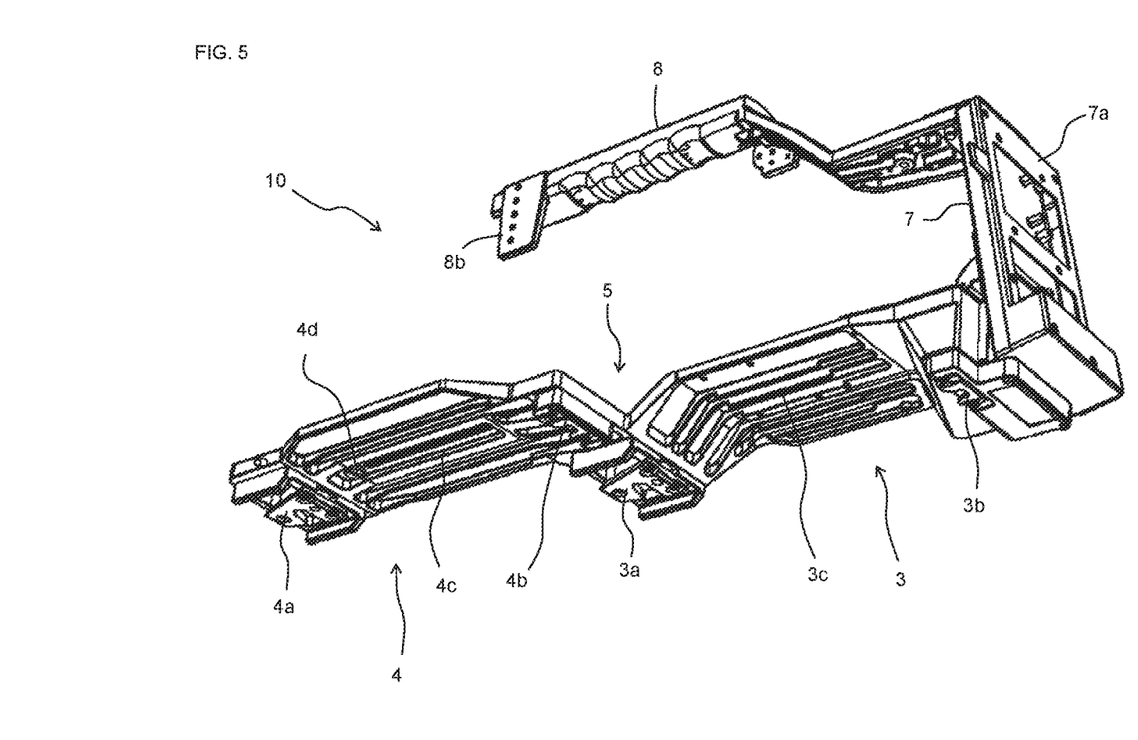
FIG. 5 is another perspective view of the shoulder camera adaptor 10.
Figure 6:
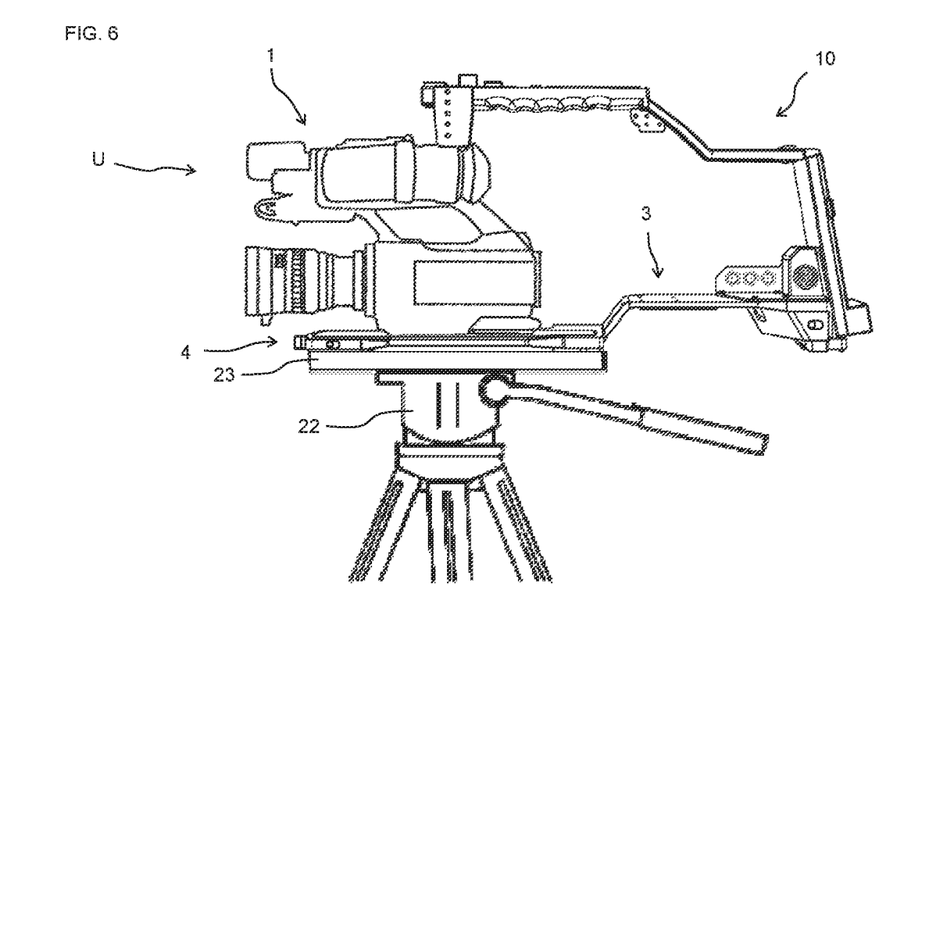
FIG. 6 is a right side view illustrating a state of fixing the shoulder camera adaptor 10 to a tripod base 23 using a mechanical unit of a second base 4.

The second base 4 is provided on a front end 5a side of the base 5. The second base 4 is provided in a position that is different, from the first base 3, longitudinally and transversely (that is, diagonally) in the shoulder camera adaptor 10. The second base 4 is provided with a tripod base attachment 4a and a fixture 4b for the tripod base attachment. As illustrated in FIG. 6, the attachment 4a and the fixture 4b function as a second mechanical unit to fix the shoulder camera adaptor 10 to the tripod base 23 fixed to the tripod 22. Between the attachment 4a and the fixture 4b, a camera holder 4c to hold the handy video camera 1 is provided. The camera holder 4c is provided with a video camera fixation screw 4d. The fixation screw 4d is screwed into a tripod screw hole, not shown, provided in a lower surface of the handy video camera 1, thereby fixing the handy video camera 1 to the camera holder 4c.

In such a manner, the first and second mechanical units are provided in the first and second bases 3 and 4. Since the first and second bases 3 and 4 are provided in longitudinally and transversely different positions in the shoulder camera adaptor 10, the first and second mechanical units are also provided in longitudinally and transversely different positions. Note that the first and second mechanical units may be provided in positions that are different only in the longitudinal direction.

Near the rear end of the base 5, a rear wall 7 rising from the base 5 is provided. As illustrated in FIG. 8, the rear wall 7 is provided with a battery attachment 7a to allow attachment of an external battery 24. Power can be supplied from the external battery 24 attached to the battery attachment 7a to the shoulder camera adaptor 10. The shoulder camera adaptor 10 includes a power input terminal 13 to supply power to the shoulder camera adaptor 10 via the terminal 13.

The shoulder camera adaptor 10 also includes a camera power terminal 9, a video light terminal 20, and a power output terminal 14. By connecting a power cable from the handy video camera 1 to the camera power terminal 9, power is supplied to the handy video camera 1. By connecting a power cable from a video light, not shown, to the video light terminal 20, power is supplied to the video light. In addition, by connecting a power cable from another device that requires power to the power output terminal 14, power is supplied to the device.

These terminals 9, 14, and 20 function as power output units from the shoulder camera adaptor 10. The power output from the power output units is turned on/off by switching a power switch 21. The power switch 21 is provided near the front end 5a of the base 5 and can be operated by a cameraman of the handy video camera 1. The cameraman switches the power switch 21 to generate a power supply on and off signal, and in accordance with the power supply on and off signal, power output from the power output unit is controlled.

The shoulder camera adaptor 10 also includes relay terminals 30 to 32. Connection between an output terminal of the handy video camera 1 and the relay terminals 30 to 32 enables attachment and detachment of a cable from the side of the body like a shoulder camera. In addition, it prevents an output terminal of the handy video camera 1 from being broken by collision and the like.

The shoulder camera adaptor 10 has a built-in power supply circuit composed of a DC-DC converter. The power supply circuit has a function to output external power, supplied from the external battery 24, from the camera power terminal 9 to be supplied to the handy video camera 1. The power supply circuit is configured to supply, when a voltage of the external power exceeds a predetermined value, power at a constant voltage to the handy video camera 1 and lower, when the voltage of the external power falls below the predetermined value, a voltage of the power supplied to the handy video camera 1 following the lowering of the voltage of the external power. Even when the voltage of the external power supplied from the external battery 24 is lowered, the voltage is raised by the DC-DC converter to maintain a constant voltage of the power supplied to the handy video camera 1. In that case, however, a proper voltage is continuously supplied to the handy video camera 1 although the remaining power in the external battery 24 is low, resulting in no warning of the low remaining battery power issued by the handy video camera 1. When the voltage of the external power is lowered even more, the DC-DC converter is not capable of raising the voltage to the constant voltage, causing sudden termination of the power supply to the handy video camera 1. In this case, handy video cameras using memory devices have problems of not being capable of storing the video under recording and taking time for recovery.

In contrast, when the voltage of the external power falls below the predetermined value, the present embodiment is configured to lower the voltage of the power supplied to the handy video camera 1 following the lowering of the voltage of the external power. When the remaining power in the external battery 24 is running low and the voltage of the external power falls below the predetermined value, the voltage of the power supplied to the handy video camera 1 becomes low, allowing the handy video camera 1 to generate a warning of the low remaining power in the external battery 24. This enables replacement of the external battery 24 with appropriate timing.

The shoulder camera adaptor 10 includes a handle 8 disposed above the handy video camera 1. The handle 8 has a base end 8c fixed to an upper edge of the rear wall 7 by screws 8a. The handle 8 has a front end provided with a projection 8b projecting downwardly, and the handle 8 is fixed to the handle of the handy video camera 1 via an adaptor, not shown, fixed to the projection 8b. The handle 8 is provided with the video light terminal 20, a remote controlling output terminal 15, a REC on/off button 16, and a zoom remote volume 17. By operating the REC on/off button 16, a REC on and off signal is output from the remote controlling output terminal 15. By operating the zoom remote volume 17, a zoom remote signal is output from the remote controlling output terminal 15. The handle 8 may be provided with an iris volume to output an iris signal from the remote controlling output terminal 15 by operating the iris volume. In this case, an operation unit to control output of a control signal to the handy video camera 1 is configured with the REC on/off button 16, the zoom remote volume 17, and the iris volume. The control signal (REC on and off signal, zoom remote signal, or iris signal) output from the remote controlling output terminal 15 is input to the handy video camera 1 to allow control of the handy video camera 1 without separately preparing a zoom remote controller.

The shoulder camera adaptor 10 has the base 5 provided with a REC on/off button 18 and an iris volume 19 at the front end 5a. By operating the REC on/off button 18, a REC on and off signal is output from the remote controlling output terminal 15. By operating the iris volume 19, an iris signal is output from the remote controlling output terminal 15. The base 5 may be provided with a zoom remote volume at the front end 5a.

The shoulder camera adaptor 10 in the present embodiment is provided with the mechanical units to fix the shoulder camera adaptor 10 to the tripod base 23 respectively in the first and second bases 3 and 4 and any mechanical unit may be used for fixation of the shoulder camera adaptor 10 to the tripod base 23. Use of the appropriate mechanical unit in accordance with the position of the center of gravity of an adaptor unit U configured with the shoulder camera adaptor 10 and components fixed thereto (the handy video camera 1, the external battery 24, etc.) causes the position of the center of gravity of the adaptor unit U, while the shoulder camera adaptor 10 is fixed to the tripod base 23, to be positioned near right-above the tripod 22 and thus inhibits the tripod 22 from being out of balance and falling.

Figure 7:
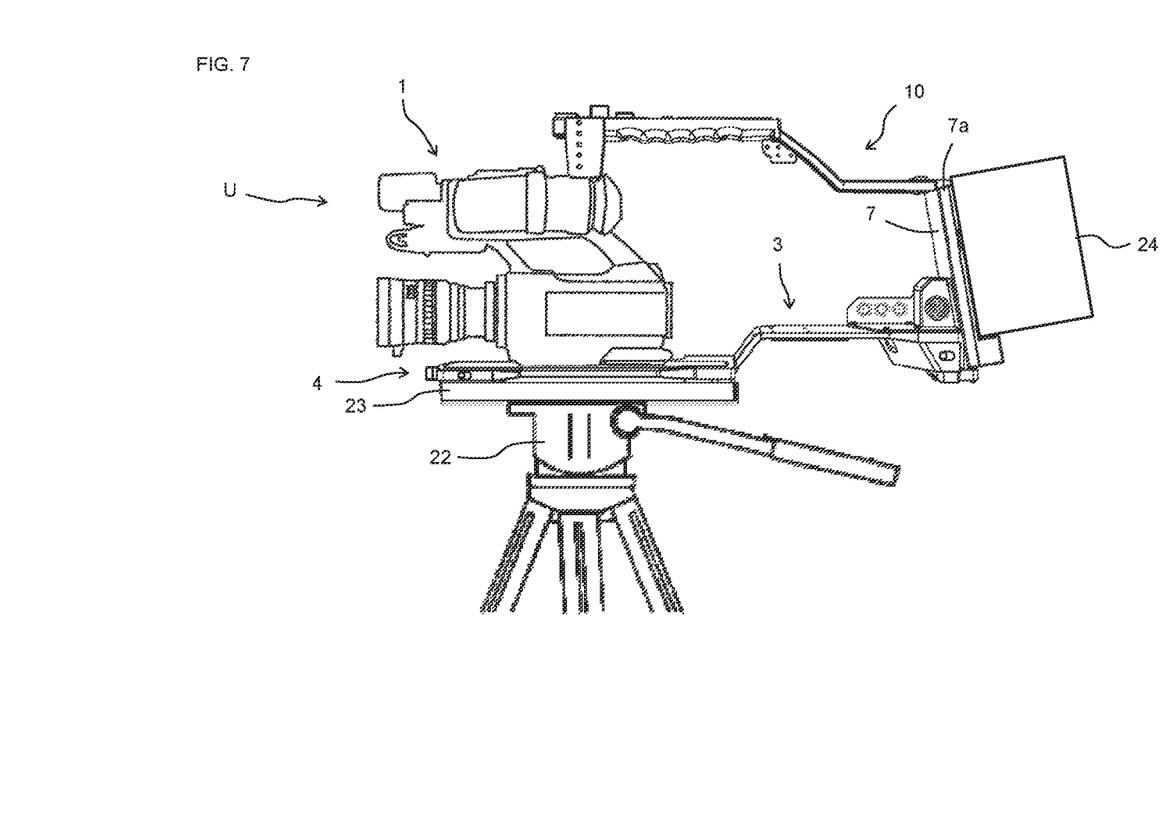
FIG. 7 is a right side view illustrating a state of mounting an external battery 24 to the shoulder camera adaptor 10 in FIG. 6.

In the example of FIG. 6, since no external battery is mounted to the shoulder camera adaptor 10, the position of the center of gravity of the adaptor unit U is positioned relatively forward. Accordingly, the shoulder camera adaptor 10 is fixed to the tripod base 23 using the mechanical unit provided in the second base 4 to stably hold the adaptor unit U on the tripod 22. Meanwhile, as illustrated in FIG. 7, when a large external battery 24 is mounted to the shoulder camera adaptor 10, the center of gravity of the adaptor unit U moves rearwardly. Even in this condition, if the shoulder camera adaptor 10 is fixed to the tripod base 23 using the mechanical unit provided in the second base 4, the tripod 22 is prone to be out of balance and fall behind. In such a case, as illustrated in FIG. 8, the shoulder camera adaptor 10 is fixed to the tripod base 23 using the mechanical unit provided in the first base 3 to stably hold the adaptor unit U on the tripod 22. In the state of FIG. 7, the adaptor unit U is also prone to tilt to the right due to the weight of the external battery 24. Such tilt is reduced by fixing the shoulder camera adaptor 10 to the tripod base 23 using the mechanical unit provided in the first base 3.

REFERENCE SIGNS LIST

1: Handy Video Camera; 3: First Base; 4: Second Base; 3a, 4a: Tripod Base Attachment; 3b, 4b: Fixture for Tripod Base Attachment; 3c: Shoulder Mount; 4c: Camera Holder; 5: Base; 7: Rear Wall; 7a: Battery Attachment; 8: Handle; 9: Camera Power Terminal; 10: Shoulder Camera Adaptor; 13: Power Input Terminal; 14: Power Output Terminal; 16, 18: REC On/Off Button; 17: Zoom Remote Volume; 19: Iris Volume; 20: Video Light Terminal; 21: Power Switch

The invention claimed is:

1. A shoulder camera adaptor used for application of a handy video camera as a shoulder camera, the adaptor comprising a base, wherein
the base includes a camera holder to hold the handy video camera, and
the base is provided with mechanical units to fix the shoulder camera adaptor to a tripod base fixed to a tripod at at least two spots in at least longitudinally different positions in the shoulder camera adaptor; wherein
the base includes first and second bases,
the second base is provided in longitudinally and transversely different positions, from the first base, in the shoulder camera adaptor, and
the second base is provided with the camera holder.

2. The shoulder camera adaptor of claim 1, wherein
the mechanical units include first and second mechanical units, and
the first mechanical unit is provided in the first base and the second mechanical unit is provided in the second base.

3. The shoulder camera adaptor of claim 1, wherein
a rear wall rising from the base is provided near a rear end of the base, and
the rear wall is provided with a battery attachment to allow attachment of an external battery.

4. The shoulder camera adaptor of claim 1, further comprising a handle disposed above the handy video camera, wherein
the handle is provided with a video light terminal to supply power to a video light mounted to the handle.

5. The shoulder camera adaptor of claim 1, further comprising a power output unit to be controlled in accordance with a power supply on and off signal from a cameraman of the handy video camera.

6. The shoulder camera adaptor of claim 1, further comprising
a power supply circuit to supply external power supplied from an external battery to the handy video camera, wherein
the power supply circuit is configured to supply, when a voltage of the external power exceeds a predetermined value, power at a constant voltage to the handy video camera and lower, when the voltage of the external power falls below the predetermined value, a voltage of the power supplied to the handy video camera following lowering of the voltage of the external power.

7. The shoulder camera adaptor of claim 1, further comprising an operation unit to control output of a control signal to the handy video camera.

8. The shoulder camera adaptor of claim 7, further comprising a handle disposed above the handy video camera, wherein
the operation unit is provided in the handle.

9. The shoulder camera adaptor of claim 7, wherein the operation unit is provided at a front end of the base.

10. The shoulder camera adaptor of claim 7, wherein the operation unit is configured to control output of at least one of a zoom remote signal, an iris signal, and a REC on and off signal.

11. The shoulder camera adaptor of claim 1, wherein
the base is provided with a shoulder mount to be placed on a shoulder of a cameraman using the shoulder camera adaptor, and
one of the mechanical units is provided across the shoulder mount.

* * * * *